US008655916B2

(12) United States Patent
Roy

(10) Patent No.: US 8,655,916 B2
(45) Date of Patent: Feb. 18, 2014

(54) SYSTEM AND METHOD FOR CREATING USER PROFILES

(75) Inventor: Howard Scott Roy, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 646 days.

(21) Appl. No.: 11/525,486

(22) Filed: Sep. 22, 2006

(65) Prior Publication Data

US 2008/0077614 A1   Mar. 27, 2008

(51) Int. Cl.
*G06F 17/30* (2006.01)
*G06F 7/00* (2006.01)

(52) U.S. Cl.
USPC ........... 707/790; 707/802; 707/803; 715/733; 715/734

(58) Field of Classification Search
USPC ............ 707/600–831, 899, 999.001–999.206
See application file for complete search history.

(56) References Cited

U.S. PATENT DOCUMENTS

| | | | |
|---|---|---|---|
| 6,151,600 A * | 11/2000 | Dedrick ............................... | 1/1 |
| 6,195,651 B1 * | 2/2001 | Handel et al. ......................... | 1/1 |
| 6,571,234 B1 * | 5/2003 | Knight et al. ........................ | 1/1 |
| 6,615,258 B1 * | 9/2003 | Barry et al. ..................... | 709/223 |
| 6,654,735 B1 * | 11/2003 | Eichstaedt et al. .................. | 707/3 |
| 6,721,748 B1 * | 4/2004 | Knight et al. ......................... | 1/1 |
| 7,076,504 B1 * | 7/2006 | Handel et al. .............. | 705/14.39 |
| 7,162,473 B2 * | 1/2007 | Dumais et al. ..................... | 707/5 |
| 7,225,249 B1 * | 5/2007 | Barry et al. ..................... | 709/227 |
| 7,269,590 B2 * | 9/2007 | Hull et al. ...................... | 707/770 |
| 2002/0042923 A1 * | 4/2002 | Asmussen et al. .............. | 725/92 |
| 2002/0161664 A1 * | 10/2002 | Shaya et al. ..................... | 705/26 |
| 2003/0066067 A1 * | 4/2003 | Gutta et al. ........................ | 725/9 |
| 2003/0066068 A1 * | 4/2003 | Gutta et al. ........................ | 725/9 |
| 2003/0101065 A1 * | 5/2003 | Rohall et al. ...................... | 705/1 |
| 2003/0154212 A1 * | 8/2003 | Schirmer et al. .......... | 707/103 R |
| 2003/0158903 A1 * | 8/2003 | Rohall et al. .................. | 709/206 |
| 2003/0163537 A1 * | 8/2003 | Rohall et al. .................. | 709/206 |
| 2003/0167310 A1 * | 9/2003 | Moody et al. .................. | 709/206 |
| 2003/0177190 A1 * | 9/2003 | Moody et al. .................. | 709/206 |
| 2003/0229529 A1 * | 12/2003 | Mui et al. .......................... | 705/8 |
| 2003/0233419 A1 * | 12/2003 | Beringer ....................... | 709/206 |
| 2004/0230572 A1 * | 11/2004 | Omoigui ........................... | 707/3 |
| 2004/0249650 A1 * | 12/2004 | Freedman et al. ................ | 705/1 |
| 2004/0267700 A1 * | 12/2004 | Dumais et al. .................... | 707/2 |
| 2005/0057584 A1 * | 3/2005 | Gruen et al. .................. | 345/752 |
| 2005/0177385 A1 * | 8/2005 | Hull et al. ......................... | 705/1 |
| 2005/0216421 A1 * | 9/2005 | Barry et al. ..................... | 705/64 |
| 2006/0173838 A1 * | 8/2006 | Garg et al. ......................... | 707/5 |
| 2007/0143260 A1 * | 6/2007 | Markov et al. .................... | 707/3 |

* cited by examiner

*Primary Examiner* — Angelica Ruiz
(74) *Attorney, Agent, or Firm* — Pillsbury Winthrop Shaw Pittman LLP

(57) ABSTRACT

A computer-implemented method for constructing a profile for a target user is disclosed. The method comprises monitoring electronic communications across a network to identify at least one electronic communication that identifies a target user as an intended message recipient, extracting metadata from content associated with the at least one electronic communication; and constructing a user profile for the target user on the basis of the extracted metadata. It is assumed that the message senders send their messages, including associated content, to a given target user with the belief that the content is of some interest to the target user on the basis of some knowledge regarding the target user's personality, preferences, tastes and the like. In this manner, a profiling entity may indirectly construct a profile of the target user based on the content sent by one or more message senders to the target user.

12 Claims, 6 Drawing Sheets

Fig. 2

SYSTEM AND METHOD FOR CREATING USER PROFILES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to systems and methods for profile creation. More specifically, embodiments of the present invention related to systems and methods for profile creation that generate a user profile on the basis of the actions of other users.

BACKGROUND OF THE INVENTION

As the amount of information available to users continues to dramatically increase, portals have become increasingly popular for aggregating and displaying information to users. Portals are an entry point or gateway that provide access to other web sites and information resources, as well as provide a single point of access to a wide variety of content, data, knowledge, and services. As such, portals have become increasingly popular with users as a starting point (often designated as their "home page", e.g., the first page displayed when a given users starts his or her browser) for their use of a network. Publicly accessible Internet portals include Yahoo! Corporation's My-Yahoo!™, Microsoft Corporation's MSN™, Google Corporation's Google News™, etc.

As more and more commerce and information is provided via a given provider's web portal, the ability to provide a gratifying user experience becomes increasingly important. A more effective means of presenting content is through the tailoring of content delivered to a given user to meet the needs, preferences and interests of the given. Personalizing content delivered to users may generally improve user satisfaction. Some web sites support personalization of one or more features of that particular Web site or a portion of that Web site, but typically only on a per-site basis. For example, a given web site may allow a user to explicitly specify certain personalization options with respect to content, layout and graphical elements of the given web site. A given user may select desired types of content, for example, by filling out a questionnaire or checklist that the site stores for retrieval when the user accesses the site.

One example of personalization is the "My Yahoo!™", section of the Yahoo!™ web portal, which allows a given user to personalize some aspects of his or her interface to Yahoo!™. FIG. 1 shows a screen diagram of the Yahoo!™ home page 100 whereby content is presented in a user without regard for any personalization preferences. FIG. 2 illustrates a screen diagram of the My Yahoo!™ home page 200. My Yahoo!™ allows a given user to develop a "front page" directed to his or her interests. FIG. 3 is a screen diagram illustrating a web page form 300 that allows a given user to personalize the content of his or her front page by explicitly selecting desired content modules from a checklist 302. My Yahoo!™ also allows a user to tailor the layout and the presentation features such as color and background based on his or her personalization preferences, using these personalization preferences to select content for the front page, as well as determine how the selected content is to be displayed.

For active users of such websites, creating or otherwise identifying personalized content is facilitated via interaction with the website. That is, users may actively select desired content in the manner described above. This technique is problematic for a new user, however, because determining what a user finds interesting cannot be resolved by observing and complying with user selected preferences, such as story type and category. Instead, the web site must rely on the user actively stating preferences for content and how to display such content. This presents an issue where the web site is unable to provide personalized content where the user has yet to provide feedback to the system indicating his or her preferences.

One proposed solution is to use existing information about the user to build a profile. One source of existing information is a click history for a given user, which may be used to determine those content items that the user finds interesting. Another source of information is the browse history of the given user. Both these approaches, however, suffer from a common drawback of requiring the user to be an existing subscriber to a publicly accessible Internet portal, such as Yahoo!™.

Accordingly, a need exists for a system and method that facilitates the construction of a user profile in the case where the user does not actively specify his or her preference for content for the purpose of constructing a user profile.

SUMMARY OF THE INVENTION

The present invention provides methods and systems for indirectly profiling a target user based on content items sent to the target user. In this manner, the target user does not actively specify his or her preference for content for the purpose of constructing a user profile. In one embodiment, indirect profiling of a target user is based on links to content items delivered from one or more users and directed to a target user. A profile server may monitor the delivered links to construct a target user profile. The profile construction methodology presumes that the delivered links to content items are of some interest to the target user and as such, provides a sufficient basis for constructing the target user profile.

In accordance with one aspect of the invention, the target user profile may be weighted in accordance with delivered links content items that the user selects to review. In this manner, the target user becomes a participant in the construction of his or her profile.

BRIEF DESCRIPTION OF THE DRAWINGS

These and other objects, features and advantages of the present invention will become apparent through consideration of the detailed description of the invention, when considered in conjunction with the drawing Figures, in which:

Figure 2:
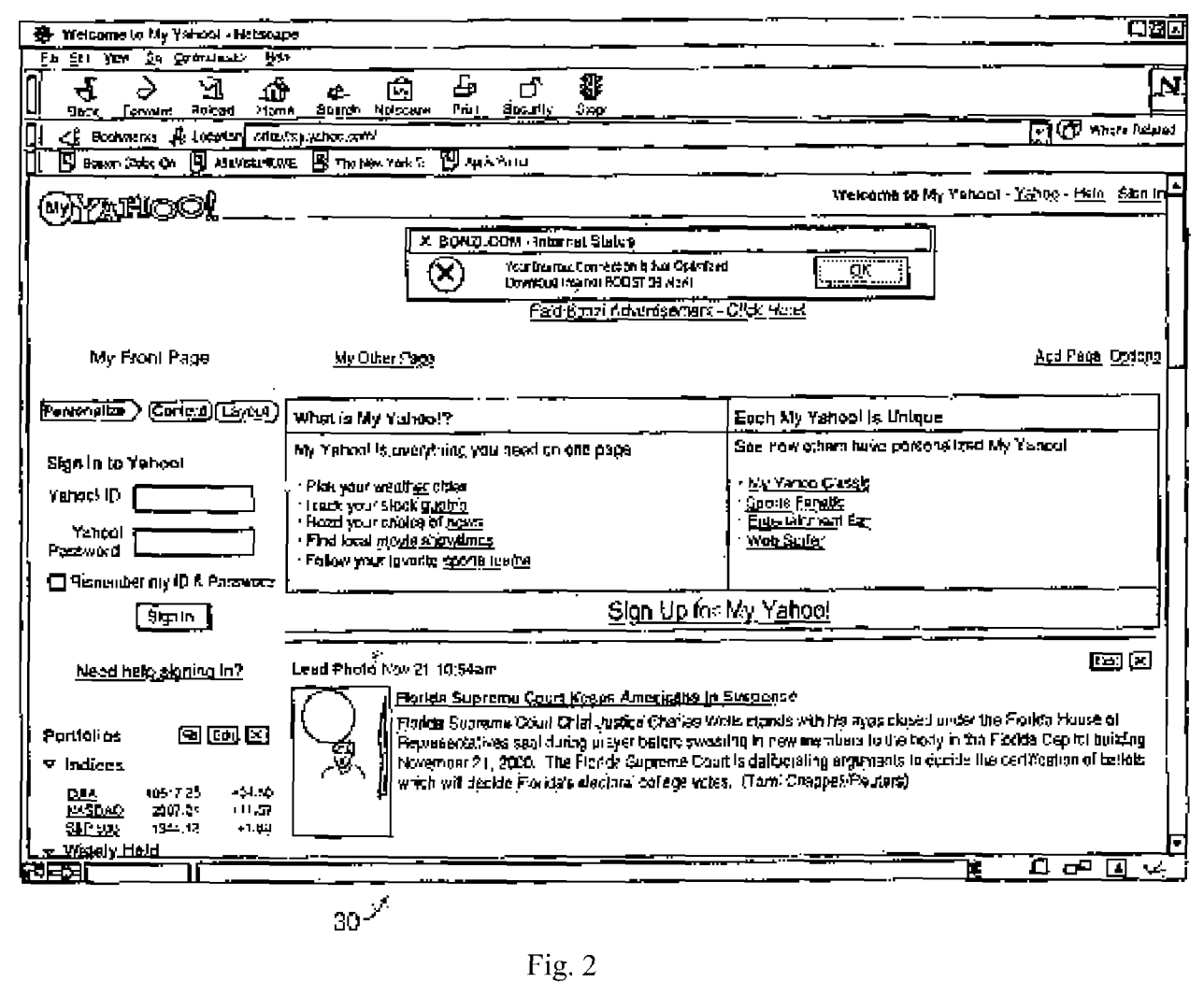

FIG. 2 is a screen diagram illustrating a browser window of a Yahoo!™ web page that allows a user to access website specific, explicit personalization features according to the prior art;

DETAILED DESCRIPTION OF THE EXEMPLARY EMBODIMENTS

Figure 1:
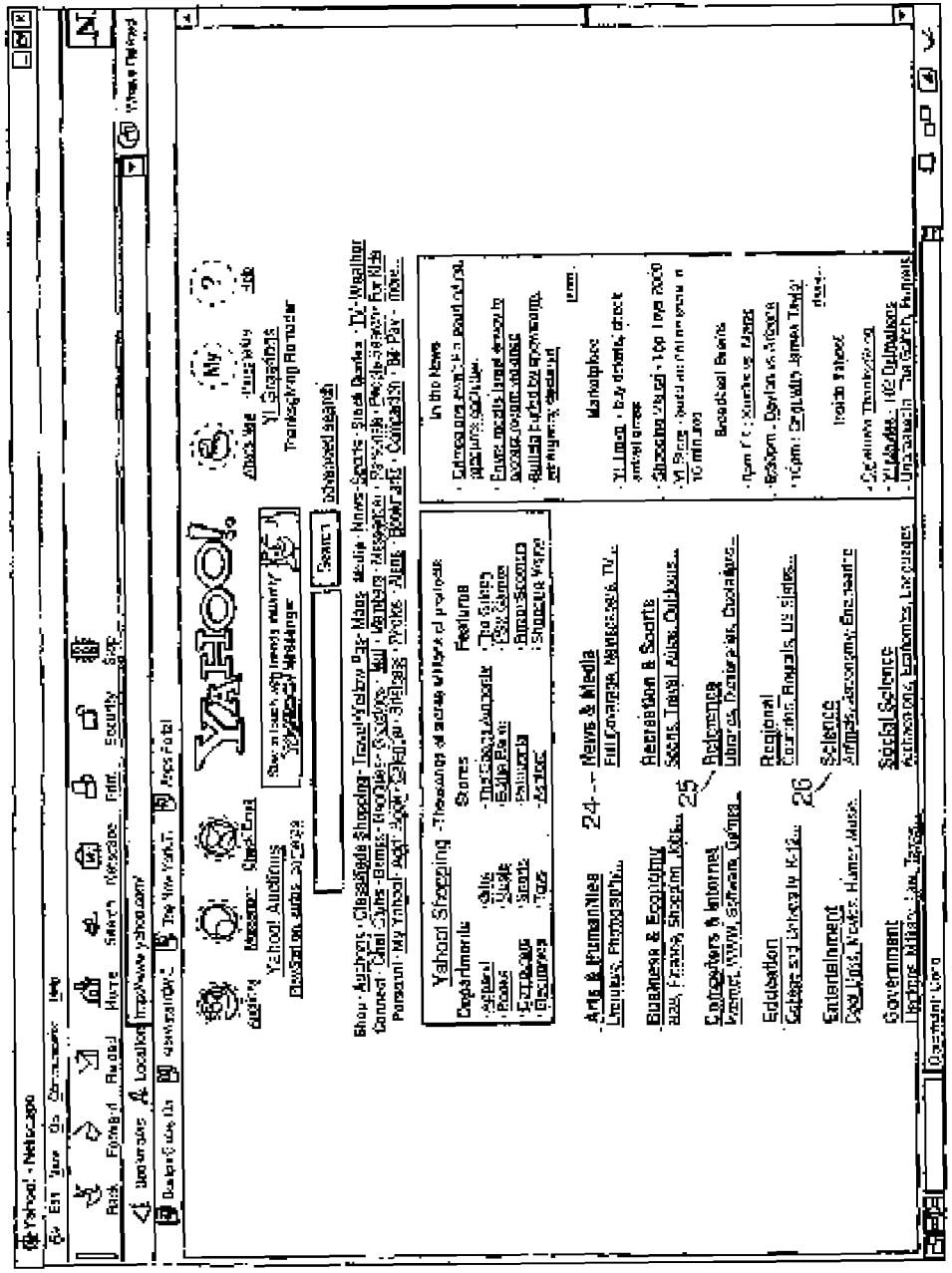
FIG. 1 is a screen diagram illustrating a browser window displaying a home page provided by Yahoo!™ according to the prior art.
Figure 3:
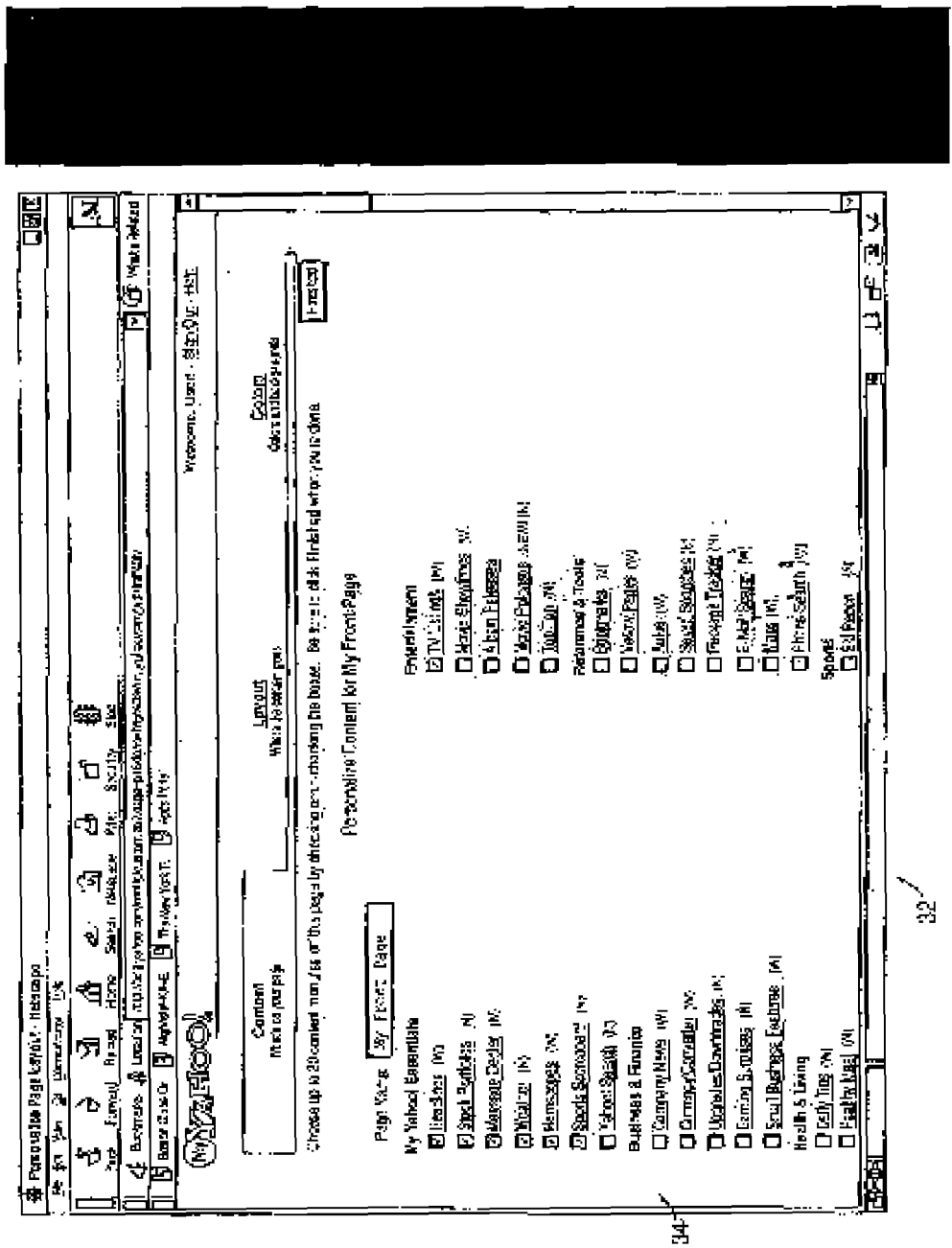
FIG. 3 is a screen diagram illustrating a browser window of a Yahoo!™ web page that allows a user to select specific types of content for a personalized "My Front Page" according to the prior art.

The present invention is now be described in detail with reference to the drawings, which are provided as illustrative examples of the invention so as to enable those skilled in the relevant art(s) to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention is intended to encompass present and future known equivalents to the known components referred to herein by way of illustration.

Although the invention is discussed primarily with respect to communications transferred over the Internet to facilitate web-based profile creation, any suitable network, network topology, transmission protocol, sender-receiver device and relationship, and other characteristics or properties of electronic devices, processes and transmission methods may be utilized. For example, features of the invention may be employed on a smaller scale to local area networks (LANs), campus or corporate networks, home networks, etc. As used herein, the term, "e-mail", unless otherwise specified expressly or by context, is intended to have a broad non-limiting definition, and refers, without limitation, to any form of electronic communication data standard, e.g., SMTP, POP, IMAP4, etc.

In general, throughout this description, if an item is described as implemented in software, it may alternatively be implemented as hardware, or a combination of both hardware and software. It is also understood that "data," as used herein, is either singular or plural as the context requires. It should further be appreciated that computer code for implementing aspects of the present invention in software may utilizes various combinations of C, C++, HTML, XML, Java, JavaScript, etc. code, or any other suitable scripting language (e.g., VBScript) know to those of skill in the art.

The embodiments described herein provide techniques for indirectly profiling a target user, e.g., learning a user profile, on the basis of content selected by other users. The methodology for indirectly profiling a target user is based on an assumption that content transmitted from other users, directed to a target user, is presumably of some interest to the target user, which may be premised on a given other user's presumed familiarity with the target user. Specifically, it is assumed that the given other user sends a given content item to the target user on the basis of some knowledge regarding the target user's personality, preferences, tastes, etc. One or more other users sending content to the target user may include, but are not limited to, friends, relatives, business associates of the target user, etc. The content may be broadly defined to include articles, music, videos, artwork and the like.

A profile for a target user may be constructed or otherwise learned by a third party entity such as a web portal provider or content provider, interested in acquiring user profile to attract users to their website. There is no restriction, however, on who may manage the task of generating the target user profiles. Typical third party entities may include, for example, well known web portal service providers, such as Yahoo!™ or Amazon, or content providers such as the New York Times on-line division or the CNN on-line division.

Figure 4:
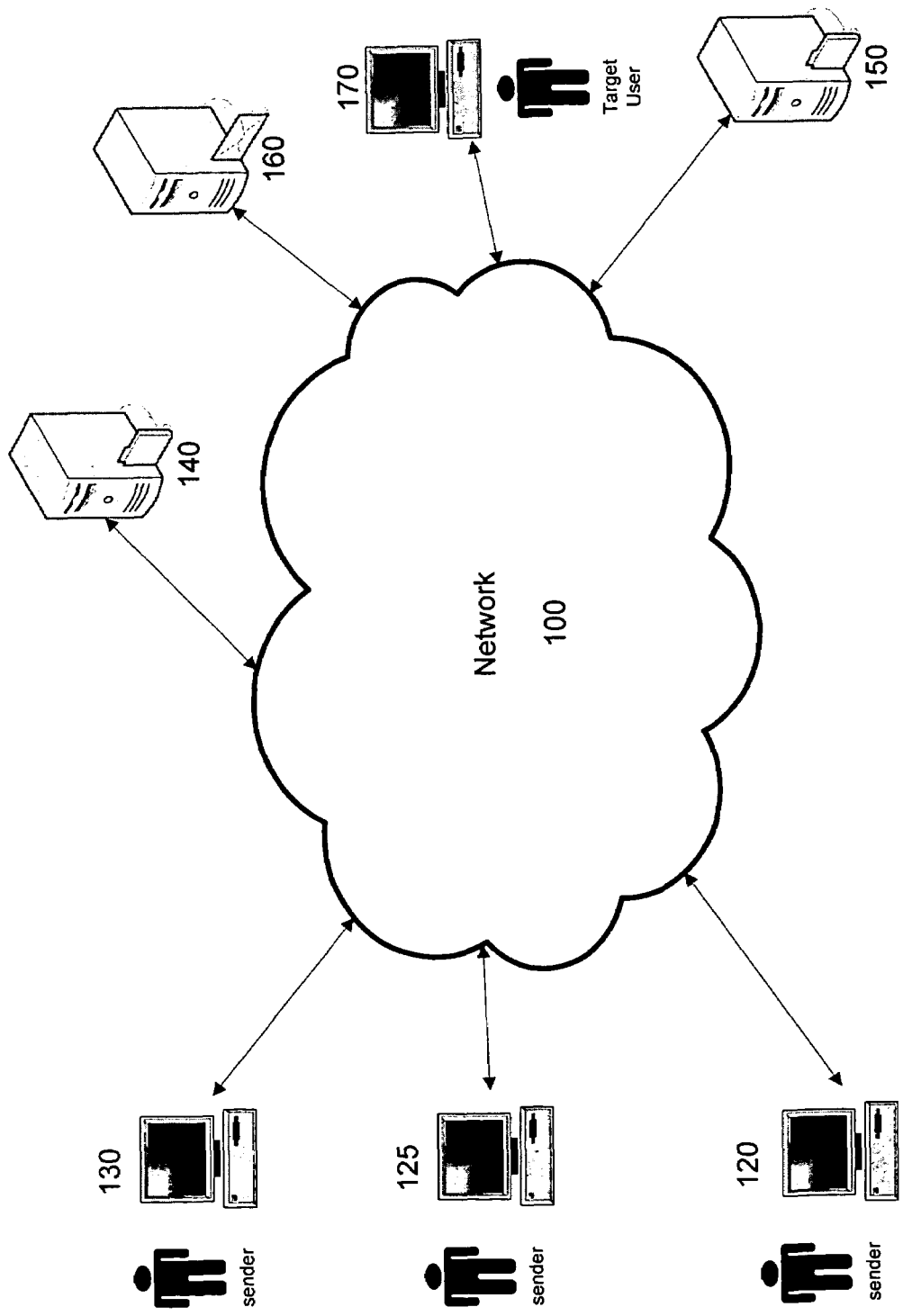
FIG. 4 is a block diagram illustrating a operating environment for learning a user profile according to one embodiment of the present invention.

Referring now to FIG. 4, there is illustrated a representative network environment according to one embodiment of the present invention. Client computers 120, 125 and 130 operated by senders are communicatively coupled to the network 100, which may comprise connections to one or more local and wide-area networks, such as the Internet. By communicating over the network 100, a given client computer 120, 125 and 130 is operative to access a content server 140 for the retrieval and display of one or more content items. A given content item may include, but is not limited to, text, audio, video, images, and various combinations thereof.

A given content item may comprise a control, the selection of which by a sender operating a given client device 120, 125 and 130 sends a link to the content item to a target user operating a target client device 170. According to one embodiment, program code operating at the content server 140 is operative to receive a signal indicating selection of the control and generate an electronic mail message that includes the link to the content item for transmission to the target client device 170. Alternatively, to create and send email messages, (including links to content items) a browser running on the client computers 120, 125 and 130, includes or interoperates with a standard email client, such as the Outlook™ email client distributed by Microsoft Corp., headquartered in Bellevue, Wash.

An electronic mail server 160 receives an electronic mail message from the content server 140 and transfers the electronic mail message, including a link to the content item, over the electronic network 100 for transmission to a target user operating a target client device 170. The emails may be transferred across the network 100 through one or more servers before reaching the electronic mail server 160 that provides electronic mail message to the target client device 170. It is understood that the diagram in FIG. 4 is a simplified depiction of an electronic network and a user base. In general, any number of users, devices, components and processes, in one or more networks can make up a network. The communication channels can be optical, wired, wireless, or other transmission means.

The control that the content server presents to a sending user of a client device 120, 125, 130 may comprise program or other computer executable code that is operative to open a communication channel to a profile server 150 over the network 100. The content server utilizes the communication channel to transmit information regarding the content item that the sending user has selected for transmission to the target client device 170. The profile server 150 receives information regarding the content item that includes, but is not limited to, title, author, publication date, topic, category, etc. Additionally, the profile server 150 receives any additional information that the sender provides including, but not limited to, information identifying the sender and information identify the target user. The profile server 150 utilizes these data that the content server provides to generate a profile for the target user, which the profile server 150 may combine with data previously sent by senders to the target user.

One embodiment according to which the content server may a copy of information regarding the link to a given content sent from the sender of a client computer 120, 125 and 130 to a given target user is to include redirection code in the content links which are commonly labeled, for example, "send this link", "email", or "email to a friend." The redirection code, embedded in these links, may be configured to temporarily redirect the associated content item (e.g., article or story) from the target user to the profile server to allow for the extraction of metadata to facilitate construction of a user profile for the target user. The extracted metadata may include, for example, sender identity, receiver identity, topic, source, author, locality, language and so on. Subsequent to extracting the relevant metadata, the link to the content item may be forwarded to the target user. Alternatively, redirection code may be added into a toolbar executing on the client computer 120, 125 and 130. When a sending user selects a URL to send to a target user, code in the toolbar may access content provided by the content sever whereby the code temporarily redirects the content to the profile server.

Because the content server 140 is operative to send the user a link to the content item, the content server may encode the link with additional information to allow for tracking of the selection of the link by the target user. According to one embodiment, the link that the content server 140 provides to the target user of a target client device 170 in an electronic mail message that an electronic mail server 160 maintains is encoded with redirection information. When the target user selects the link in the electronic mail message that the target client device 170 displays, program or other computer executable code included in the link transmits a message to the profile server 150 indicating the selection. The target client device also initiates communication with the content server 140 to retrieve the content item that the link identifies. Alternatively, the target client device 170 may access the profile server 150 (providing an indication of the selection) and be redirected to the content server 140.

Figure 5:
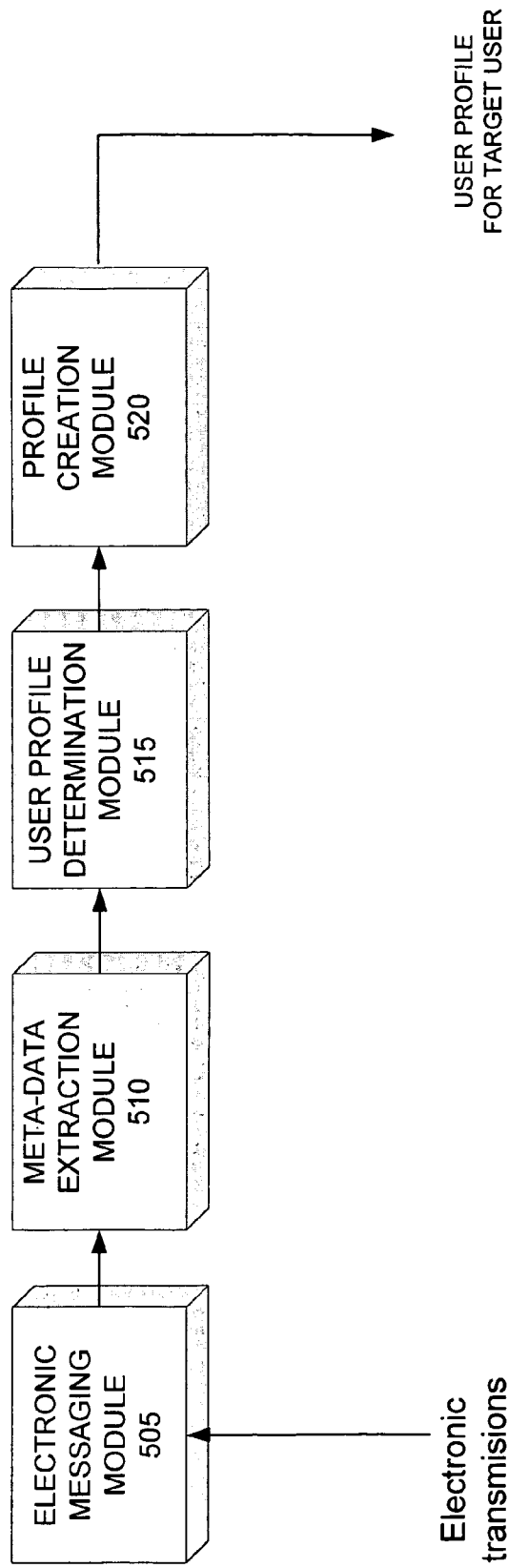
FIG. 5 is block diagram illustrating modules for learning a user profile according to one embodiment of the present invention.

FIG. 5 is an exemplary software block diagram of one embodiment of the software modules that the profile server comprises. The one or more software modules may include an electronic message monitoring module 505, a metadata extraction module 510, a user profile determination module 515 and a profile creation module 520.

The particular electronic communication identified by the message monitoring module 505 that identify the target user as that intended recipient may be temporarily redirected away from the target user by the message monitoring module 505 to the profile server. In the case where the identified electronic communication includes a link to a content item as an attachment or otherwise as part of the electronic communication, metadata regarding the content item and the electronic communication is extracted by a metadata extraction module 510 as a basis for constructing a user profile for the target user. The extracted metadata may comprise, for example, sender identity, receiver identity, topic, source, author, locality, language and so on.

The extracted metadata may be combined with previously acquired and extracted metadata to form combined metadata. The combined metadata may be optionally provided as input to a user profile determination module 515 of the profile server to determine whether the combined metadata is statistically significant to form a user profile of the target user based on some threshold criteria. The user profile determination module 515 may employ a threshold test on the combined metadata to make its determination. It is noted that the threshold levels employed by the threshold test may be adjusted in accordance with different criteria, including, for example, a time frame over which the content is to be collected or a desired profile accuracy.

A profile creation module 525 creates the user profile from the combined metadata, which may or may not include the threshold test. The profile creation module 520 may construct a user profile using machine learning techniques known to those of skill in the art. A more detailed explanation of machine learning techniques may be found in U.S. patent application Ser. No. 11/036,604, entitled "REPUTATION BASED SEARCH," filed on Jan. 14, 2005 and and U.S. patent application Ser. No. 10/864,074, entitled "QUERY BASED SEARCH ENGINE," filed on Jun. 8, 2004, the disclosures of which are hereby incorporated by reference herein in their entirety. As the sending users utilize client computers to transmit links to additional content items to the target user, the target user's profile may be refined over time by the software components at the profile server.

In one embodiment, construction of a target user profile may incorporate a weighting scheme. For example, duplicative content items delivered to the target user may be weighted less than singly transmitted items. Additionally, where it is determined that a target user reads or views a given content item, the content item may be weighted more heavily than content that is not read or viewed by the target user. In this manner, the target user is considered to be an active participant in the makeup of his or her user profile.

In one embodiment, the content server may suggest other content items to the target user on the basis of the created user profile for the target user. Matching technology may be employed to match content from the web service provider content repository with the user profile. The target user profiles of various target users may be compared for profile similarities, thereby allowing the content server to determine if there are any similar interests between target users. Identifying profile similarities among target users allows the content server to recommend content items (e.g., articles and stories) to those target users having similar interests.

It is also contemplated to utilize a weighting scheme to build social networks amongst users. In one embodiment, a profile server may track the volume of communications transmitted, in each direction (e.g., bi-directionally), between two hypothetical users A and B. A volume weighting score may be computed which reflects the number of communications sent from one user to another in a particular direction. For example, a high volume weighting score for communications sent from user A to B, reflects a large number of communications sent from A to B over some specified time period. The volume weighting scores may be used as a basis for building social networks between users. A high volume weighting score between two users presumably is indicative of some degree of compatibility between the two users.

In another embodiment, a weighting score may be computed for a target user based on the amount of content actually read or viewed by the target user. For example if a target user C reads all of the content sent from user A and none of the content sent from user B, the system may presume that there is a stronger relationship between users A and C. Of course, weighting scores may be computed based on other criteria familiar to those of skill in the art and not explicitly recited herein In one embodiment, a content provider may form an alliance with a web portal provider, such as Yahoo!, such that whenever a user browsing content items at the content provider clicks on a link to transmit a link to a given content item to a target user, that information request is forwarded to the profile server of the web portal provider by agreement. In this manner, users of the content server become prospective target users of the Yahoo!™ web portal service.

In operation, electronic communications are monitored at a public server to identify those electronic communications whose intended recipient is a target user. It is appreciated that the public server may identify one or many target users at any point in time. Upon identifying a given target user at the public server, a process of extracting metadata from any associated content is performed, in a manner similar to that described above.

Figure 6:
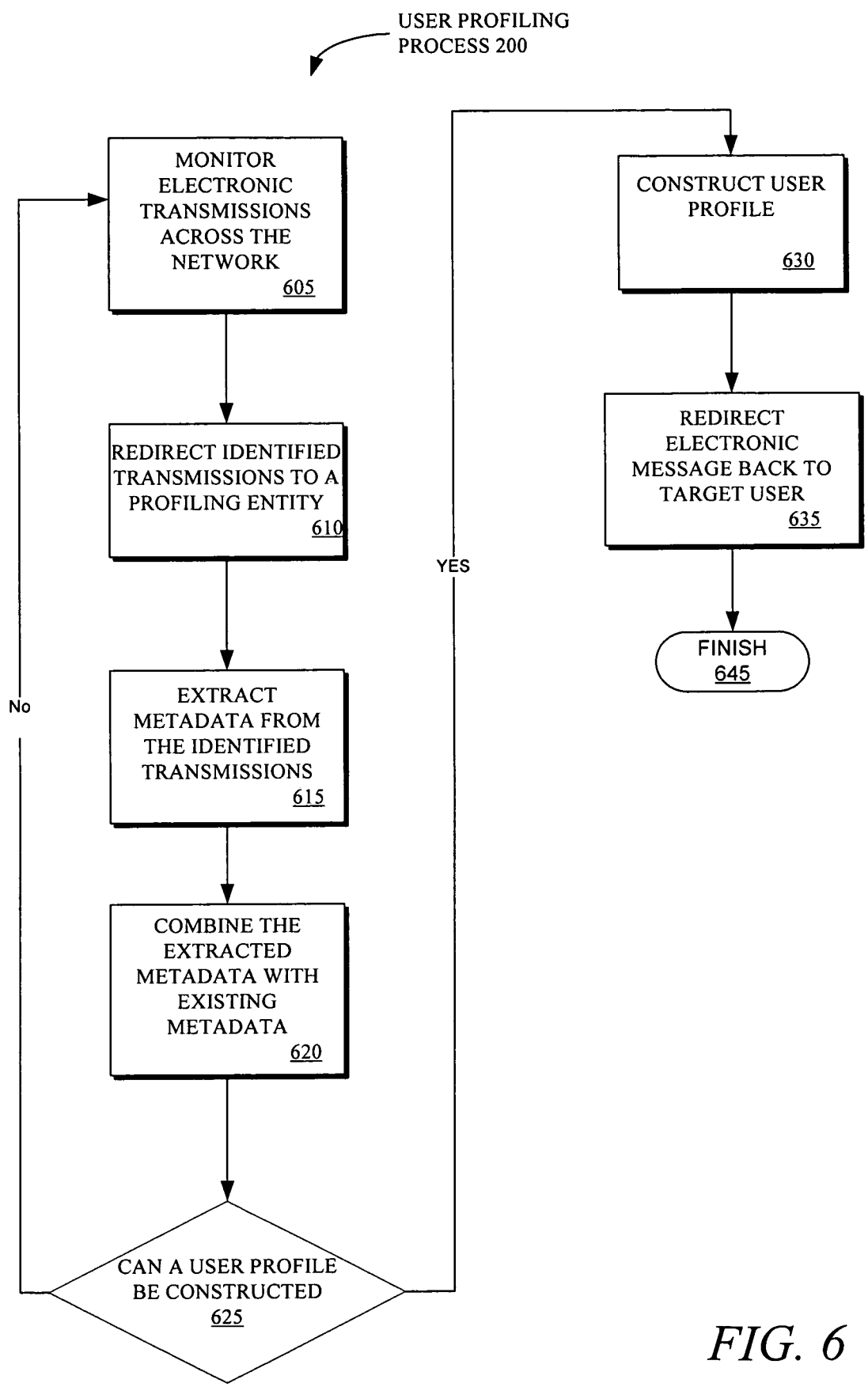
FIG. 6 is a flow diagram illustrating method for learning a user profile according to one embodiment of the present invention.

FIG. 6 depicts one embodiment of a process 600 for learning a profile for a target user. The process 600 is described with reference to the exemplary embodiment of the system of FIGS. 4 and 5 for learning a profile for a target user. At block 605, electronic communications are monitored across a distributed network by a profiling entity to identify those electronic communications directed to a specific target user as an intended recipient. At block 610, an identified electronic message at block 605, is temporarily redirected from the target user to a profile server.

At block 615, the redirected electronic messages are parsed by the profile server to extract metadata from a content item to which the electronic communication links, which may be provided as a message attachment. In certain cases, a given electronic message may include an attachment, such as an article, for which it is assumed the sender believes to be of some interest to the target user, as recipient.

At block 620, the extracted metadata is combined with any previously extracted metadata from previously identified electronic messages transmitted to the target user and at block 625 a determination is made regarding whether the totality of metadata is sufficient to construct a user profile. a user profile is constructed at block 630 for the given target user, based on the totality of metadata upon satisfying the determination at block 625. At block 635, the electronic message is redirected back to the target user as intended receiver.

Using the foregoing specification, the invention may be implemented as a machine (or system), process (or method), or article of manufacture by using standard programming and/or engineering techniques to produce programming software, firmware, hardware, or any combination thereof.

The invention has been described with reference to particular embodiments. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. A computer-implemented method for constructing a profile for a target user, the method comprising:
    monitoring personal electronic communications across a network to identify at least one given personal electronic communication identifying a target user as an intended recipient of the given personal electronic communication, the given personal electronic communication including one or more content items;
    extracting metadata from the one or more content items and said at least one identified personal electronic communication, wherein the one or more content items include at least an attachment;
    storing the extracted metadata in a profiling database, indexed for the target user; and
    constructing a user profile for the target user on the basis of the extracted metadata;
    matching the extracted metadata in the target user profile with extracted metadata in a second user profile for a second target user to determine one or more profile similarities between the target user profile and the second target user profile; and
    suggesting additional content to the target user based on the one or more profile similarities between the target user profile and the second target user profile, wherein the additional content is at least one of an article, music, a video, artwork.

2. The method of claim 1, wherein the extracted metadata comprises at least one of a topic, a source, an author, a locality and a language.

3. The method of claim 1, further comprising determining whether to construct said user profile for the target user based on the extracted metadata.

4. The method of claim 3, wherein said determination is based on a statistical threshold test.

5. The method of claim 3, further comprising, upon determining that said user profile for the target user will not be constructed from the extracted metadata, returning to said monitoring step to monitor additional electronic communications.

6. The method of claim 1, wherein said constructing step is based on a machine learning technique.

7. The method of claim 1, wherein said one or more content items included in the electronic communication is an e-mail attachment.

8. A profiling system for indirectly profiling a user over a distributed network, the system comprising:
    a monitoring module configured to monitor personal electronic transmissions transmitted across a network to identify at least one personal electronic transmission identifying a target user as an intended message recipient, the at least one personal electronic transmission including one or more content items;
    a metadata extraction module configured to extract metadata from the one or more content items and the at least one personal electronic transmission, wherein the one or more content items include at least an attachment;
    a profiling database for storing the extracted metadata;
    a profile creation module for constructing a user profile for the target user based on said extracted metadata; and
    a comparison module for matching the extracted metadata in the target user profile with extracted metadata in a second user profile for a second target user so as to determine one or more profile similarities between the target user profile and the second target user profile and suggesting additional content to the target user based on the one or more profile similarities between the target user profile and the second target user profile, wherein the additional content is at least one of an article, music, a video, artwork.

9. The profiling system of claim 8, further comprising a user profile determination module for determining whether the extracted metadata describes content transmitted to the target user.

10. The profiling system of claim 9, wherein a test for determining whether the extracted metadata describes content transmitted to the target user is a statistical threshold test.

11. The profiling system of claim 8, wherein the profile creation module constructs said user machine learning technique.

12. The method of claim 1, wherein each content item comprises one of text, audio, video, an image, and a control.

\* \* \* \* \*